W. R. Anderson.
Mucilage Brush.
N° 62,108. Patented Feb. 19, 1867.
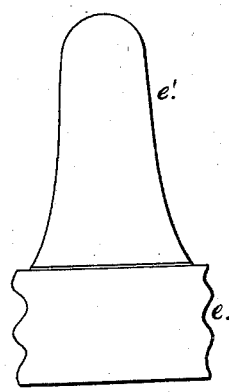
Fig. 1.
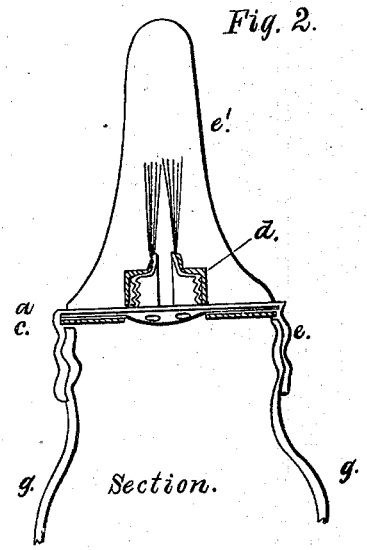
Fig. 2. Section.
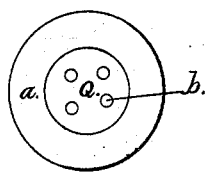
Fig. 3.
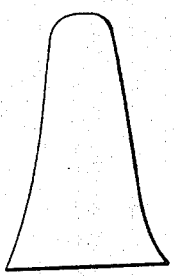
Fig. 9.
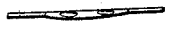
Fig. 4.
Fig. 5.
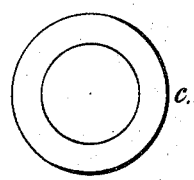
Fig. 6.
Fig. 7.
Fig. 8.
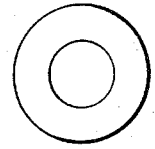
Fig. 10.
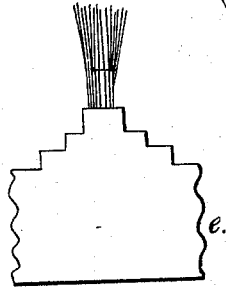
Fig. 11.
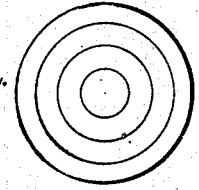
Fig. 12.
Witnesses.
Robert Curren
J. D. West
Inventor.
Wm R Anderson
pr S D Gale
Attorney

United States Patent Office.

WILLIAM R. ANDERSON, OF NEW YORK, N. Y.

Letters Patent No. 62,108, dated February 19, 1867.

---

IMPROVEMENT IN MUCILAGE AND MARKING-BRUSHES.

---

The Schedule referred to in these Letters Patent and making part of the same.

---

Be it known that I, WILLIAM R. ANDERSON, of the city, county, and State of New York, have invented certain new and useful devices in the construction of Mucilage and Marking-Brushes; and I hereby declare that the following is a full and sufficient description thereof, reference being had to the accompanying drawings and references which make part of the same.

The invention consists in the mode of making the fastening of the mucilage brush, that is, the bristles, and holding them, but particularly the holding of the bristles in place on the outside of the tube around which they are arranged. The necessity of the case is that the liquor which feeds the brush must come or flow through the handle. The bristles, therefore, must be arranged on the outside in order to secure them and bind them firmly and keep them from the direct contact with the liquid which flows along the inside of the tube, and would have the effect, if in direct contact, to soften the cement used to fasten the bristles in place. The bristles are fastened to the periphery of the pipe or tube, and by means of a cement, which is regarded insoluble in water, although most of this class of cements are so softened by the presence of water as to require some extra aid to sustain them in place. The ordinary mode of sustaining the bristles in place is to wind twine or small wire around the bristles. This device, however, does not prevent the contact of the liquid with the outer surface, and so, by degrees, moisten and soften the cement. My device consists in screwing down upon the surface of the bristles a tube slightly conical on the inside, and thus fills up the space between the two and prevents the ingress of any fluid from without, and, pressed equally upon every part of the bristled surface, makes a fine finish and durable article. In the accompanying drawings—

Figure 1 represents an elevation of the screw cap to be fitted on the neck of the mucilage bottle.

Figure 2 is a sectional elevation in the line $x\ x$ of fig. 1.

Figure 3 is a view of the filtering metallic plate $a\ a$, seen on under side.

Figure 4 is an edge view of plate $a\ a$, the under surface being convex.

Figure 5 is an edge view of the rubber gasket $c$.

Figure 6 is a top view of the rubber gasket $c$.

Figure 7 is an elevation of the screw-fastening band $d$ for the bristles.

Figure 8 is a top view of the fastening-band $d$.

Figure 9 is an elevation of the metallic covering cap $e$ of the brush.

Figure 10 is a top view of the same.

Figure 11 is an elevation of the cap and brush in position for receiving the covering cap $e$.

Figure 12 is a top view of the cap and brush without the covering cap $e$.

To enable others skilled in the art to make and use my invention, I will describe it somewhat in detail.

The principal parts are made from what is called "Britannia ware," or lead, or other desirable metals. The screw cap $e$ may be cast, when the article is large and required to be heavy, but it may be made of spun metal, and the screw is also spun on the sides of the cap. The bristle tube $i$, around which the bristles are arranged, is also spun up from the cast metal, and the bristles are laid around it in lines parallel with the axis, ready to be cemented to the outside of the tube preparatory to adapting the fastening-band $d$, which grasps firmly the bristles and holds them in place. The tube $i$ is covered with shellac or other suitable cement, and, while in the plastic state, the bristles are adapted thereto and fastened temporarily till the fastening-band or shield $d$ is ready to be screwed into its place, covering and protecting the bristles from wet. The brush and fastening-band, having been completed, the gasket $c$ is laid upon the mouth of bottle $g\ g$, and the filtering-plate or disk $a$ is placed on it with the convex surface downward, or both placed inside of cap $e$ in the same position, and the screw cap $e$ is firmly screwed into its place on the mucilage bottle, which bottle, having been charged with mucilage or its equivalent, which is one ounce of gum arabic and three ounces of water, or any other like proportion, after standing three or four hours the bottle is ready for use.

To use the bottle and brush as a mucilage or marking-brush, remove the covering cap $e$ and invert the bottle, holding it firmly in the right hand, either paste or write as you have occasion to do. When the work is completed, replace the bottle in its original position and place cap cover $e$ over the brush, which prevents exposure of brush to the air, and the evaporation of the mucilage passing off through the brush, the hardening of the same is prevented, and always remains moist and ready for use.

Having fully described my fountain-brush and the method of using it, what I claim as my invention, and desire to secure by Letters Patent, is—

The combination of the shield tube $d$ with the cemented surface of the brush tube $i$ for excluding moisture, and forming a durable shield-fastening substantially in the manner set forth.

I also claim, in combination with the reservoir, the filtering-plate $a\ a$, substantially as set forth.

WM. R. ANDERSON.

Witnesses:
    L. D. GALE,
    CHRISTIAN VON HESSE.